Aug. 8, 1967  R. J. BOYLAN  3,334,473
RECONDITIONING OF FILTER MEDIA
Filed March 20, 1964
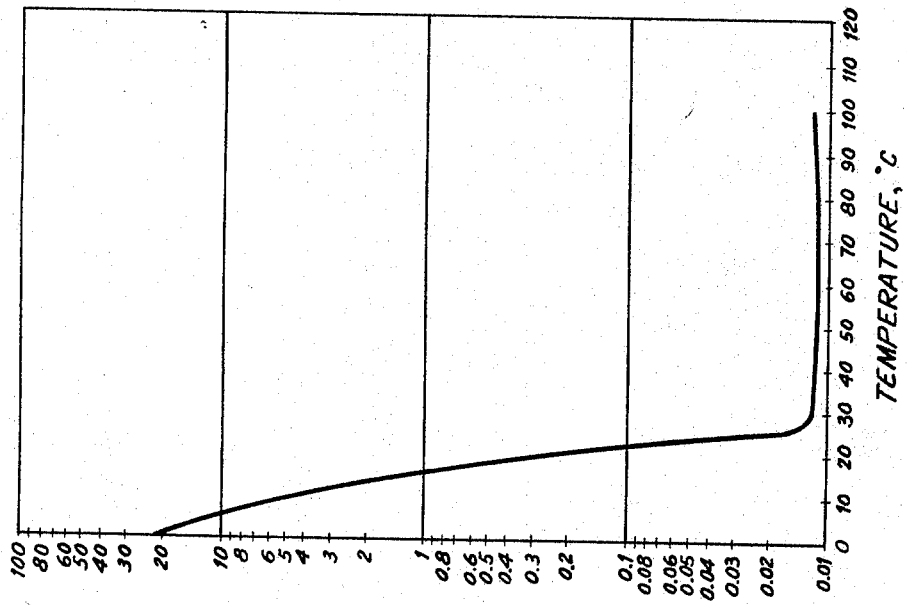
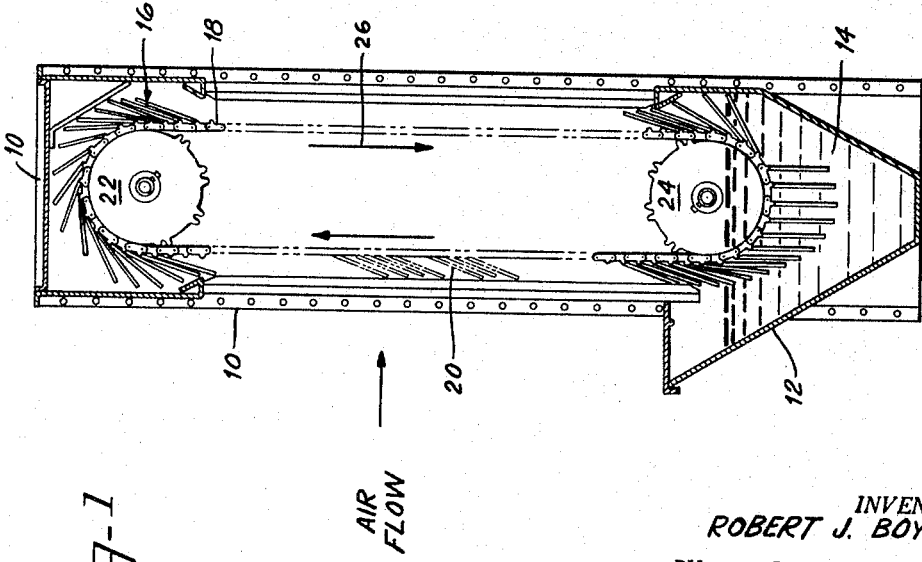
INVENTOR.
ROBERT J. BOYLAN
BY
ATTORNEY States Patent Office 3,334,473
Patented Aug. 8, 1967

3,334,473
RECONDITIONING OF FILTER MEDIA
Robert J. Boylan, Jeffersonville, Ind., assignor to American Air Filter Company, Inc., Louisville, Ky., a corporation of Delaware
Filed Mar. 20, 1964, Ser. No. 353,376
3 Claims. (Cl. 55—524)

This invention relates to ventilating air filters and particularly to automatic permanent viscous impingement type filters employing metal membered media coated with a viscous coating agent of improved character.

Atmospheric dust filters of the automatic viscous impingement type employing permanent filter media are a well-known category of ventilating air filter and are widely employed, either alone or in banks thereof, in diverse installations wherein heavy dust loads are present and high air handling capacity is required. Conventionally, such type filter units include a filter medium made of metal members such as blades, wire screens, sheets or the like having appreciable effective depth and offering a relatively low resistance to air flow therethrough; a tank of viscous liquid material from which the surfaces of the medium may be liberally coated or treated with such liquid to positively retain and hold dust particles which impinge thereon and wherein the automatic feature is provided by means for progressively moving the metal-membered filter medium on an endless track into and through the tank contained viscous liquid to remove at least a portion of the dirtied liquid material therefrom and to renew such surfaces with a coating of fresh material preparatory to their re-entry into the air stream.

The enduring character of the filter medium in such type units permits continual reuse thereof through the reconditioning operation effected by repetitive media passage through the viscous material reservoir. For any given filter medium and rate of displacement thereof, the effectiveness of the reconditioning operation is largely dependent upon the character of the viscous material employed therein. Such viscous materials should desirably have, in addition to good dust catching and retention properties and non-hygroscopicity, a relatively high and constant viscosity over the temperature range encountered during filter operation, a high flash point and non-smoking characteristics to comply with fire underwriters' standards and requirements.

Although numerous viscous materials of generally suitable character are known to the art and are conventionally employed in such types of filters, certain problems attendant use thereof have never been overcome due to the necessary non-hygroscopicity to assure acceptable constancy of viscosity over the temperature range encountered in operation. One of these problems is the condensation of water on the portions of the filter medium disposed in the air stream being filtered under certain conditions of temperature and humidity and the freezing thereof at lower temperatures with resultant deleterious effects.

This invention may be briefly described as an improved atmospheric dust filter formed of displaceable permanent viscous impingement type filter media and selective high molecular weight polyglycolic viscous coating materials thereon.

Among the advantages attendant use of the subject invention is the provision of viscous material coated permanent filter media of improved character which minimizes, if not avoids, the deleterious consequences heretofore attendant moisture condensation and freezing in automatic permanent viscous impingement type filters.

Other objects and advantages of the invention will be apparent from the following portions of the specification which, pursuant to the requirements of the patent statutes, includes a detailed description of the best mode presently contemplated by the inventor for carrying out his invention.

The primary object of this invention is the provision of improved viscous material coated permanent filter media for automatic filters.

Another object of this invention is the provision of an improved method of operation of automatic permanent viscous impingement type filters.

Referring to the drawings:

FIGURE 1 is a schematic side sectional view of the essentials of an automatic permanent viscous impingement type filter of the type herein of concern;

FIGURE 2 is a graph generally indicative of the water solubility-temperature relationship for the viscous coating materials disclosed herein.

Referring to the drawings, and particularly to FIGURE 1, automatic permanent viscous impingement type filters of the type herein of concern conventionally include a vertical perimetric frame 10 dependently terminating in a tank or reservoir 12 for viscous coating material 14, a plurality of horizontally disposed metal-membered screens or screen-like units 16, pivotally and terminally secured to endless belts 18 and spaced so as to be disposed in overlapping relationship when positioned in the air stream, as at 20, to form a plurality of tortuous air passages therethrough. The endless belts 18 are mounted on sprockets 22 and 24 so as to effect progressive displacement of the permanent filter media screens 16 appended thereto in the direction of travel indicated by the arrows 26. As illustrated, the continuous advance of the endless belts 18 causes the individual screens 16 to be displaced in separate spaced relation through the viscous material 14 in the reservoir 12 to effect removal of the coated dirt thereon and to replenish the cleaned surfaces thereof with a fresh coating of viscous material 14 preparatory to their re-introduction to the air stream. As is apparent from the drawings, the dirt removed from the screens during their passage through the viscous material settles to the bottom of the tank 12 to form a sludge therein.

In accordance with the principles of this invention, the viscous liquid material 14 constitutes polypropylene glycols of the general formula

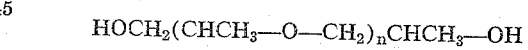
$$HOCH_2(CHCH_3-O-CH_2)_nCHCH_3-OH$$

where $n$ varies from about 32 to 34 and preferably is about 33.6. Materials so specified will have an average molecular weight suitably falling within the range of about 1900 to 2100, with a molecular weight in the range of about 1975–2025 being preferred.

The above specified viscous coating materials have satisfactory dust catching and retention properties and constitute substantially odorless liquids having flash points around 450° F., pour points around −30 to −40° F., and acceptable orders of viscosity over the temperature ranges normally encountered in operation of the type of filter above described.

Apart from the above generally desirable properties, polypropylene glycols of the character above specified have peculiarly increased water solubility at lowered temperatures. As best shown in FIGURE 2, water solubility is effectively negligible for temperatures of 30° C. and above, being only slightly greater than .01% and, in fact, it is only about .2% at 20° C. In the range, however, from 20° C. to 0° C., the water solubility markedly increases about a hundred-fold from about .2% to about 20%. The above described selective characteristic or property of increasing solubility of water in the coating material in inverse relation to temperature, for the lower temperature ranges only, not only results in the minimization, if not avoidance, of moisture condensation and possible freezing thereof on the coated media surfaces at the lower temperature ranges wherein such most often occurs, through moisture absorption by the coating material, but also results in the permitted maintenance of a more uniform viscosity across the operating temperature ranges normally encountered. The absorption of moisture in the coating at the lower temperature ranges effects dilution of the coating material which tends to increase its viscosity from the otherwise lowered viscosity values that are attendant lowered temperatures. Conversely the absorbed moisture in the coating material will be released as the temperature rises and the consequent viscosity increase attendant increased concentration will tend to counteract the normal viscosity decrease attendant an increase in temperature.

It will be apparent from the foregoing that the disposition of the subject material on the media surfaces in automatic permanent viscous impingement type filters not only markedly minimizes, if not avoids, the deleterious effects of moisture condensation and freezing at lowered temperatures, but unexpectedly provides a greater degree of uniformity of viscosity and particularly in the same low temperature range wherein marked viscosity increases are normally encountered.

By way of illustrative example, a suitable polypropylene glycol viscous coating material is Polyglycol P–2000 as manufactured by the Dow Chemical Company of Midland, Mich. This material, which is a polypropylene glycol having an average molecular weight of about 2000 has a specific gravity of 1.002 and a water solubility of less than .1% at 25° C. Its unmodified viscosity is generally as follows:

| T ° F.: | Viscosity (centistokes) |
|---|---|
| 32 | 1880 |
| 77 | 230 |
| 100 | 164 |
| 210 | 23.9 |

Another suitable material comprises polypropylene glycol 2025 as manufactured by Union Carbide Corp. This material which has an average molecular weight in the range of 1950–2100, has a specific gravity of 1.006 and a water solubility of less than .15% at 20° C. Its viscosity is approximately the same as above tabulated.

Having thus described my invention, I claim:

1. In the reconditioning of viscous impingement type filter media of enduring character, the step of progressively displacing dirtied media into and through a tank of polypropylene glycol having an average molecular weight in the range of from 1900 to 2100.

2. In the reconditioning of viscous impingement type filter media of enduring character, the step of progressively displacing dirtied media into and through a tank of polypropylene glycol having an average molecular weight in the range of from 1975 to 2025.

3. The method step as set forth in claim 1 wherein said polypropylene glycol is of the general formula $$HO—CH_2(CHCH_3—O—CH_2)_nCHCH_3—OH$$

and wherein $n$ has a value within the range of 32 to 34.

References Cited

UNITED STATES PATENTS

| | | | |
|---|---|---|---|
| 2,511,295 | 6/1950 | Roop | 261—80 |
| 2,789,093 | 4/1957 | Foehr | 252—52 |
| 2,870,864 | 1/1959 | Brixius | 261—80 |
| 3,000,963 | 9/1961 | Speranza | 260—615 |
| 3,131,084 | 4/1964 | Boylan | 117—104 |
| 3,221,480 | 12/1965 | Stefcik et al. | 55—524 |
| 3,246,655 | 4/1966 | Spears et al. | 55—524 |

OTHER REFERENCES

Rose: "The Condensed Chemical Dictionary," 6th ed., 1961 (pp. 917 and 918 relied upon).

LEON D. ROSDOL, *Primary Examiner.*

M. WEINBLATT, *Assistant Examiner.*